United States Patent [19]
Gayle et al.

[11] Patent Number: 6,059,900
[45] Date of Patent: May 9, 2000

[54] LEAD-BASED SOLDERS FOR HIGH TEMPERATURE APPLICATIONS

[75] Inventors: Frank W. Gayle, Gaithersburg, Md.; James A. Slattery, Sauquoit, N.Y.

[73] Assignee: Indium Corporation of America, Utica, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/025,638

[22] Filed: Feb. 18, 1998

[51] Int. Cl.$^7$ ........................................ C22C 7/00
[52] U.S. Cl. ............................ 148/400; 148/24; 420/564; 420/565
[58] Field of Search ..................... 420/564, 565; 148/24, 400

[56] References Cited

FOREIGN PATENT DOCUMENTS

| 1062241 | 6/1992 | China . |
|---|---|---|
| 53-059833 | 5/1978 | Japan . |
| 57-162266 | 10/1982 | Japan . |
| 3204194 | 9/1991 | Japan . |
| 122993 | 4/1984 | Poland . |
| 144180 | 4/1988 | Poland . |

OTHER PUBLICATIONS

Smith, F.J., Solubilities of thorium and Samarzum in liquid lithium–lead solutions, J. Less–Common Metals (1973), 32(2), 297–300 (abstract only), 1973.

*Primary Examiner*—Sikyin Ip
*Attorney, Agent, or Firm*—Weingarten, Schurgin, Gagnebin & Hayes LLP

[57] ABSTRACT

A high lead solder exhibiting improved wettability to metal substrates, an advantageously controlled melting range, and excellent thermal fatigue properties. It comprises about 98–100% lead and a minor amount, typically about 0.0005–0.1 wt %, based on the total weight of the solder composition, of an alkali metal selected from the group consisting of Na, K, and Li. Additional embodiments additionally comprise an amount of a grain-size controlling additive, e.g., 0.001–0.5 wt % (based on the total weight of all the components in the solder composition) selected from the group consisting of Ce, Ba, La, Pr, Nd, Sm, Eu, Gd, Th, Dy, Ho, Er, Tm, Yb, Y, Lu, Sc, Mg, Na, Se, Te, oxides thereof and mixtures thereof, in amount effective to control the Pb grain size; and 0–1 wt % of an element selected from the group consisting of Sn, In, Bi, Sb, Ag, Au, and Ga, and mixtures thereof.

6 Claims, No Drawings

LEAD-BASED SOLDERS FOR HIGH TEMPERATURE APPLICATIONS

CROSS REFERENCE TO RELATED APPLICATIONS

None STATEMENT REGARDING FEDERALLY SPONSORED RESEARCH OR DEVELOPMENT

Jointly owned with NIST.

BACKGROUND OF THE INVENTION

The invention relates to high temperature solders for use in microelectronics that are destined for use in "harsh" environments.

As microelectronics are used in more rigorous or "harsh" applications, solder used in such applications has had to be improved to survive such conditions. The need for solders useful in such environments is increasing, with applications in automotive, avionics, and telecommunications arenas. Major difficulties with solders which are cycled repeatedly from low to high temperatures include adverse reactions with the substrate, and degradation and cracking due to thermal fatigue. Very high lead solders (98–100 wt. % lead) are known to be capable of good fatigue life, but are not used because of manufacturability problems, e.g., the wetting ability of the solders onto the required substrates is poor, and because alloy grain size coarsens with concomitant fatigue life degradation when exposed to high temperatures.

Current high-temperature solder technology uses, e.g., lead based alloys containing 10% tin (Sn) (i.e., "90-10" alloy) or 10% Sn and 2% silver (Ag) (i.e., "10-88-2"). These alloys have adequate fatigue life for most applications today, but are viewed to be inadequate for future applications in harsh environments; their thermal fatigue performance is adequate but not optimal; they suffer unacceptable loss of mechanical properties after prolonged exposure at elevated temperature (since there is reaction with substrates, producing brittle intermetallic phases and a weak solute depleted region near the substrate); they have a wide melting range, which is undesirable for use in electronics assembly; and a low solidus point, precluding use in applications at higher temperatures.

Cocks U.S. Pat. No. 5,120,498 teaches the addition of 0.01 to 10% lithium (Li) to improve the wettability of alloys on glass, containing at least two elements from the following: lead (Pb), tin, indium (In), cadmium (Cd), bismuth (Bi), mercury (Hg), antimony (Sb), silver, gold (Au) and gallium (Ga). However, these alloys contain substantial amounts of the aforesaid elements; furthermore the proportion of lead in the composition does not constitute the majority, i.e., less than about 95%, of the alloy. The presence of these elements lowers the melting point of these compositions, rendering them unsuitable for the highest temperature applications.

According to M. Schwartz in Brazing (ASM International, Metals Park, Ohio 1987), 0.2–3% Li is used in Ag-based brazing alloys to enhance wettability, and 0.2% Li is used in palladium (Pd)/nickel (Ni) alloys to enhance wettability. However, these alloys melt at several hundred degrees above the desirable range for solders.

According to W. Hofmann and H. Hanneman (Z. Metalkunde Vol. 20, pp. 47–49, 1938), the addition of sodium (Na) considerably delays the recrystallization of Pb.

BRIEF SUMMARY OF THE INVENTION

The invention relates to high-temperature solder compositions, particularly high lead solders exhibiting improved wettability to metal substrates, an advantageously well-controlled melting range, and excellent thermal fatigue properties. An embodiment of the invention relates to a high lead solder composition comprising a minor amount, typically about 0.0005–0.1 wt %, based on the total weight of the solder composition, of an alkali metal selected from the group consisting of Na, potassium (K), and Li, with lead making up about 98% or more of the composition.

A further embodiment additionally comprises an amount of a grain-size controlling additive ("GCA"), e.g., 0.001–0.5 wt % (based on the total weight of all the components in the solder composition) selected from the group consisting of cesium (Ce), barium (Ba), lanthanum (La), praseodymium (Pr), neodymium (Nd), samarium (Sm), europeum (Eu), gadolinium (Gd), thorium (Th), dysprosium (Dy), holmium (Ho), erbium (Er), thulium (Tm), ytterbium (Yb), yttrium (Y), lutetium (Lu), scandium (Sc), Mg, Na, selenium (Se), tellurium (Te), oxides thereof and mixtures thereof, in an amount effective to control the Pb grain size within the alloy to $\leq 300$ $\mu$m, more preferably $\leq 200$ $\mu$m, after exposure for 200 hours at 200° C.

In yet another embodiment, 0–1 wt % of an element selected from the group consisting of Sn, In, Bi, Sb, Ag, Au, and Ga, and mixtures thereof, may be included in the solder composition.

DETAILED DESCRIPTION OF THE INVENTION

The present invention addresses the problem of wettability of very high lead alloys, i.e., greater than about 98%, preferably greater than about 99%, more preferably greater than about 99.5%, to metal substrates, which is accomplished herein through the addition of an alkali metal selected from the group consisting of Na, K and Li in an amount of about 0.0005–0.1 wt % (i.e., 5–1000 ppm), preferably about 0.0005–0.05 wt % (i.e., 5–500 ppm), more preferably about 0.0005–0.01 wt % (i.e., 5–100 ppm.) The wettability at these levels of addition is surprisingly achieved, since an amount of alkali metal in the high lead solder above the basic range results in a degradation in the physical properties of the alloy. Not only does the wettability of the lead alloy decrease, but at amounts above the basic range the lead is more susceptible to oxidation, and the alloy also becomes more brittle.

The high lead alloys of the invention advantageously include other additives. For example, an amount of a grain-size controlling additive effective to control the Pb grain size within the alloy to $\leq 300$ $\mu$m, preferably $\leq 200$ $\mu$m, after exposure for 200 hours at 200° C., may be desirably included. This feature (maintaining and controlling a small grain size) is important to maximizing the fatigue life of the high lead alloy at high temperatures, e.g., 200° C. Such additives may be selected from the group consisting of Ce, Ba, La, Pr, Nd, Sm, Eu, Gd, Th, Y, Dy, Ho, Er, Tm, Yb, Lu, Sc, Mg, Na, Se, Te, oxides thereof and mixtures thereof.

Other elements may be added, at up to about one percent each, in order to modify various physical and mechanical properties of the alloy such as the rate of dissolution of the substrate during soldering, and oxidation resistance.

For example, Sn, In, Bi, Sb, Ag, Au and Ga may be added up to 1% each, in order to modify various other mechanical and physical properties of the solder such as strength, creep rate, substrate dissolution protection, and oxidation and corrosion resistance.

The solder may be made by adding the aforementioned alkali metal (including the aforementioned additional additives), preferably in the form of a master alloy, to a melt of pure lead at a temperature above the melting point of lead. Care should be preferably taken to prevent excessive oxidation during manufacture and use, although under most practices this is not a problem when a master alloy of Pb with less than 0.1% of the alkali metal is used to prepare the final alloy.

In an advantageous embodiment, a high lead solder composition comprises Li in an amount of about 0.001–0.02%, Te as a grain-size controlling additive in an amount of about 0.005–0.1%, and lead comprising the remainder of the composition. In another advantageous embodiment, a high lead solder composition comprises Li in an amount of about 0.001–0.02%, Mg as a grain-size controlling additive in an amount of about 0.005–0.05%, and lead comprising the remainder of the composition. In yet another advantageous embodiment, a high lead solder composition comprises Li in an amount of about 0.001–0.02%, Te and Mg as grain-size controlling additives in amounts of about 0.005–0.1% and 0.005–0.05%, respectively, and lead comprising the remainder of the composition.

EXAMPLE 1

A small sample of several solder alloys in accordance with the invention were reflowed above the liquidus point of the alloy, then solidified onto copper substrates. The samples were then put into a furnace at 205° C. for 200 hours to simulate exposure to a harsh environment during use. The samples were sectioned, polished, etched and examined metallographically. The grain size data are shown in Table 1. It is seen that the presence of Te, Se, Ce, and Mg contribute to a refined grain size in the presence of Li-containing Pb alloy. These alloys meet the target grain size of less than 200 μm after 200 hours of exposure at 205° C., which is advantageous, since small grain size correlates with improved fatigue performance.

TABLE 1

| Grain size 205° C. (μm) | Pb | Li | GCA[1] |
|---|---|---|---|
| 100 × 100 | 99.99 | 0.0072 | |
| 50 × 50 | 99.98 | 0.0027 | 0.01 Te |
| 50 × 50 | 99.98 | 0.0030 | 0.01 Se |
| 50 × 50 | 99.95 | 0.0010 | 0.04 Ce |
| 25 × 25 | 99.89 | 0.0005 | 0.01 Mg |

[1]Grain controlling additive

A standard wetting balance test was performed on several alloys on a MULTICORE MUST II instrument to determine wetting behavior. The results of this testing are shown in Table 2. The force was measured at 2 seconds and 5 seconds into the test. A large positive number indicates the best wetting. For manufacturability a positive force is desired, since this indicates rapid and adequate wetting for assembly of components on circuit boards. It is seen that a positive value was obtained for each of the alloys of the present invention at 5 seconds, i.e., those containing Li and/or GCAs, and that the alloys containing Te and Mg had good performance at 2 seconds as well. Note also that none of the alloys in accordance with this disclosure showed "dewetting" behavior (shown by an decrease in F between 2 and 5 sec.), while the prior art compositions P1 and P2 evidenced undesirable dewetting behavior.

TABLE 2

Wetting Balance

| | F(2s) (mN) | F(5s) (mN) | Pb | Ag | In | Li | Other |
|---|---|---|---|---|---|---|---|
| | 0.16 | 0.20 | 99.98 | | | 0.0027 | 0.01 Te |
| | −0.06 | 0.09 | 99.98 | | | 0.0030 | 0.01 Se |
| | −0.02 | 0.10 | 99.95 | | | 0.0010 | 0.04 Ce |
| | 0.04 | 0.10 | 99.89 | | | 0.0005 | 0.01 Mg |
| P1 | 0.16 | 0.13 | 92.5 | 2.5 | 5 | | |
| P2 | 0.39 | 0.35 | 8.8 | 10 | 2 | | |

EXAMPLE 2

The effect of the addition of lithium to a high lead alloy is illustrated in the following example, showing the wetting behavior of a high-lead alloy on a polished copper substrate. An OFHC (oxygen free high copper) polished copper substrate, cleaned with sulfuric acid for approximately 30 seconds, followed by rinsing and methanol washing, was used as the substrate. Flux was applied to the front and the back of the substrate. A pellet of solder was placed on the copper substrate, and additional flux was placed on top of the pellet. The substrate was then placed on a programmable hot plate surface at a temperature of 340° C., then removed 20 seconds after the melting of the alloy. The height and diameter of the melted pellet was measured, and the contact angle determined. As can be seen from the data in Table 3, the contact angle for the lead alloys containing a very small amount, i.e., 0.012%, of lithium is greatly improved compared to pure lead, and is comparable to the good wetting performance of the 90/10 lead/tin alloy. Furthermore, it can be seen that addition of an amount of lithium greater than 0.01% results in an decrease of wetting ability, surprisingly showing that only very small amounts of lithium added to a substantially pure lead alloy impart greatly improved wetting properties to the alloy.

TABLE 3

| | Diameter (mm) | Height (mm) | Contact Angle (degrees) |
|---|---|---|---|
| 90% Pb/10% Sn | 3.58 | 0.365 | 23.1 |
| | −3.77 | 0.440 | 26.3 |
| 99.82% Pb/0.12% Li | 3.10 | 0.580 | 41.0 |
| | 3.22 | 0.515 | 35.5 |
| 99.988% Pb/0.012% Li | 3.31 | 0.425 | 28.8 |
| | 3.76 | 0.430 | 25.8 |
| 100% Pb | 2.60 | 0.635 | 52.1 |
| | 2.78 | 0.630 | 48.8 |
| | 3.15 | 0.638 | 44.1 |

The foregoing description is meant to be illustrative of the invention. Other embodiments and variations will be apparent to those of ordinary skill in the art without departing from the inventive concepts contained herein. Accordingly, this invention is to be viewed as embracing each and every novel feature and novel combination of features present in or possessed by the invention disclosed herein and is to be viewed as limited solely by the scope and spirit of the appended claims.

What is claimed is:

1. A high lead solder composition for high temperature electrical applications consisting of:
   (a) about 0.0005–0.1 wt %, based on the total weight of said solder composition, of an alkali metal selected from the group consisting of Na, K and Li;
   (b) a grain-size controlling additive selected from the group consisting of Ce, Ba, Pr, Nd, Sm, La, Y, Eu, Gd, Th, Dy, Ho, Er, Tm, Yb, Lu, Sc, Mg, Se, Te, oxides thereof and mixtures thereof, effective to control Pb grain size within the alloy to $\leq 300\,\mu$ after exposure for 200 hours at 200° C.; and (c) the remainder being Pb.

2. The solder composition of claim 1 wherein the amount of said grain-size controlling additive is from about 0.001–0.5 wt %, based on the total weight of all the components in the solder composition.

3. The solder composition of claim 1 wherein the amount of said grain-size controlling additive is effective to control the Pb grain size within the alloy to $\leq 200\,\mu$ after exposure for 200 hours at 200° C.

4. The solder composition of claim 1 wherein said alkali metal comprises Li in an amount of about 0.001–0.02%; and said grain-size controlling additive comprises Te in an amount of about 0.005–0.1%.

5. The solder composition of claim 1 wherein said alkali metal comprises Li in an amount of about 0.001–0.02%; and said grain-size controlling additive comprises Mg in an amount of about 0.005–0.05%.

6. The solder composition of claim 1 wherein said alkali metal comprises Li in an amount of about 0.001–0.02%; and said grain-size controlling additive comprises Te in an amount of about 0.005–0.1% and Mg in an amount of about 0.005–0.05%.

* * * * *

UNITED STATES PATENT AND TRADEMARK OFFICE
CERTIFICATE OF CORRECTION

PATENT NO. : 6,059,900  
DATED : May 9, 2000  
INVENTOR(S) : Frank W. Gayle et al.

Page 1 of 1

It is certified that error appears in the above-identified patent and that said Letters Patent is hereby corrected as shown below:

<u>Title page,</u>
Item [73] reads: "Assignee: Indium Corporation of America, Utica, N.Y." should read:
-- Assignee: Indium Corporation of America, Utica, N.Y. and The Government of the United States of the America, as represented by the Secretary of Commerce, National Institute of Standards and Technology, Washington, D.C. --

Signed and Sealed this

Eleventh Day of September, 2001

*Attest:*

*Attesting Officer*

NICHOLAS P. GODICI  
*Acting Director of the United States Patent and Trademark Office*